(12) United States Patent
Hughes et al.

(10) Patent No.: US 7,596,504 B2
(45) Date of Patent: Sep. 29, 2009

(54) MANAGEMENT OF SUPPORT CENTER CALLS

(75) Inventors: Kimberly J. Hughes, Longmont, CO (US); Harry D. Tillman, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1331 days.

(21) Appl. No.: 10/644,677

(22) Filed: Aug. 20, 2003

(65) Prior Publication Data

US 2005/0043983 A1 Feb. 24, 2005

(51) Int. Cl.
*G06F 17/60* (2006.01)
*H04M 3/00* (2006.01)

(52) U.S. Cl. .................. 705/9; 705/1; 705/7; 705/8; 379/218.01; 379/265.01; 379/265.04; 379/265.06; 379/266.08

(58) Field of Classification Search .................. None
See application file for complete search history.

(56) References Cited

U.S. PATENT DOCUMENTS

| 5,737,728 | A | * | 4/1998 | Sisley et al. .................. 705/8 |
| 5,745,692 | A |   | 4/1998 | Lohmann, II ............... 395/200 |
| 6,182,059 | B1 |  | 1/2001 | Angotti et al. ................ 706/45 |

(Continued)

FOREIGN PATENT DOCUMENTS

JP 2000-149174 A 5/2000

(Continued)

OTHER PUBLICATIONS

Hollman, Lee (2002) "CRM branches out" Call Center Magazine. Dec, vol. 15, Iss. 12; p. 38, 6 pgs.*

*Primary Examiner*—Albert DeCady
*Assistant Examiner*—Dave Robertson
(74) *Attorney, Agent, or Firm*—Yee & Associates, P.C.; Arthur J. Samodovitz

(57) ABSTRACT

A computer system and program product for managing support of an application. First program instructions receive a request to view contact information for support people for the application, and in response, determine whether the request occurs during On Shift support hours or Off Shift support hours of the application and determine the support people who are On Shift and the support people who are Off Shift for the application. There is a preferred e-mail address for On Shift contact and a preferred e-mail address for Off Shift contact for each of the support people. The preferred e-mail address for On Shift contact is different than the preferred e-mail address for Off Shift contact for at least one of the support people. Second program instructions receive a request to send an e-mail to one or more of the On Shift and Off Shift support people. If the e-mail request occurs On Shift, the e-mail is sent to the preferred On Shift e-mail address for each of the one or more On Shift support people and each of the one or more Off Shift support people. If the e-mail request occurs Off Shift, the e-mail is sent to the preferred Off Shift e-mail address for each of the one or more On Shift support people and each of the one or more Off Shift support people. The computer system also displays the support people in an order based on whether the current time is On Shift or Off Shift.

5 Claims, 13 Drawing Sheets

U.S. PATENT DOCUMENTS

| | | |
|---|---|---|
| 6,356,633 B1 | 3/2002 | Armstrong ................... 379/265 |
| 6,493,446 B1 * | 12/2002 | Cherry ................... 379/265.05 |
| 6,519,571 B1 * | 2/2003 | Guheen et al. ................. 705/14 |
| 6,574,605 B1 * | 6/2003 | Sanders et al. .................. 705/8 |
| 6,587,556 B1 | 7/2003 | Judkins et al. ............... 379/219 |
| 6,639,982 B1 * | 10/2003 | Stuart et al. ............. 379/266.03 |
| 6,937,715 B2 * | 8/2005 | Delaney ................ 379/265.09 |
| 6,981,000 B2 * | 12/2005 | Park et al. ................. 707/104.1 |
| 2002/0076031 A1 | 6/2002 | Falcon et al. ........... 379/265.11 |
| 2002/0077876 A1 | 6/2002 | O'Meara et al. ................ 705/8 |
| 2002/0123983 A1 | 9/2002 | Riley et al. .................... 707/1 |
| 2003/0033185 A1 | 2/2003 | Leto et al. ....................... 705/8 |
| 2005/0015501 A1 * | 1/2005 | Kaplan et al. ............... 709/228 |
| 2006/0059253 A1 * | 3/2006 | Goodman et al. ........... 709/223 |

FOREIGN PATENT DOCUMENTS

JP     2002-057801 A     2/2002

* cited by examiner

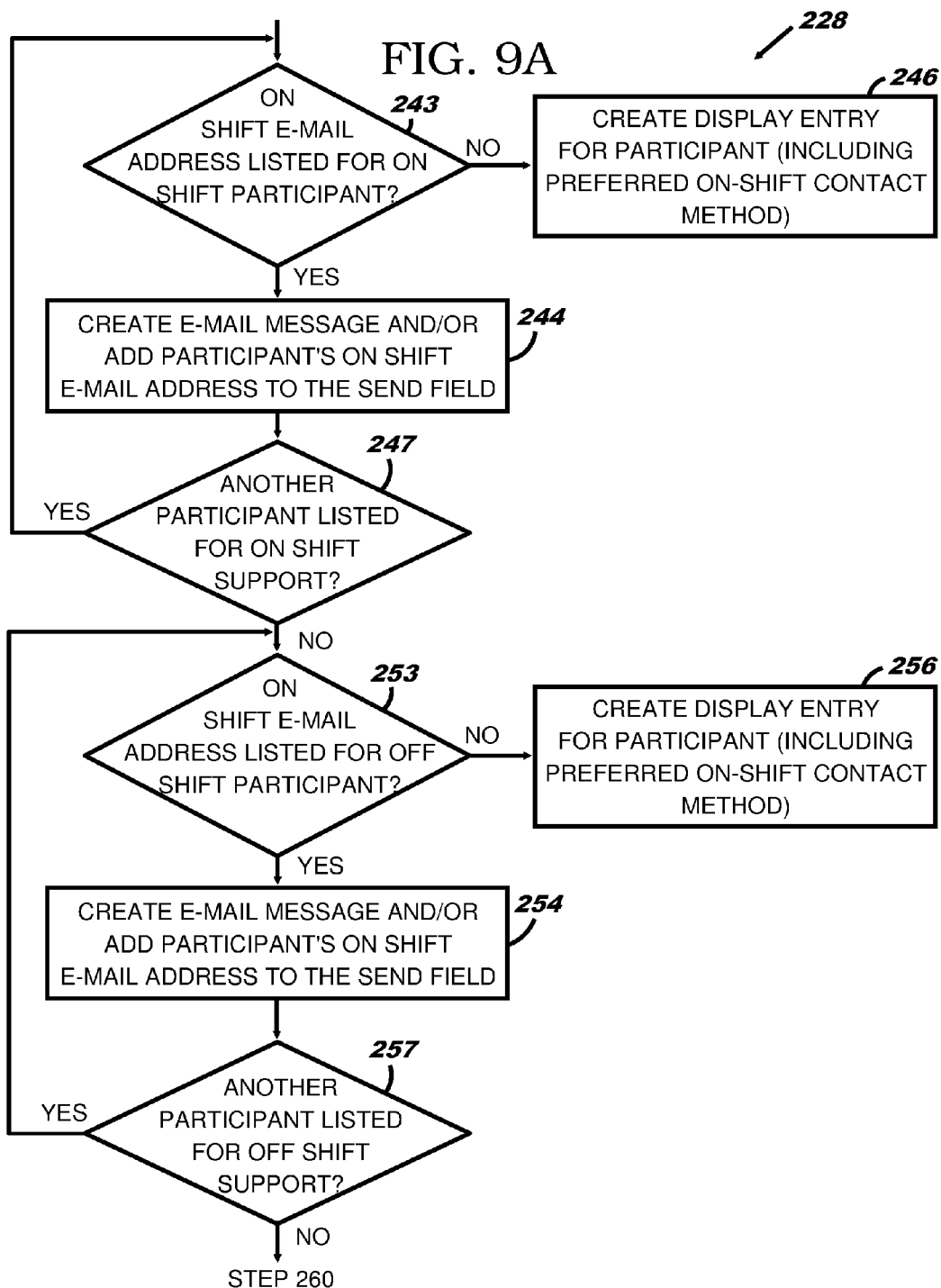

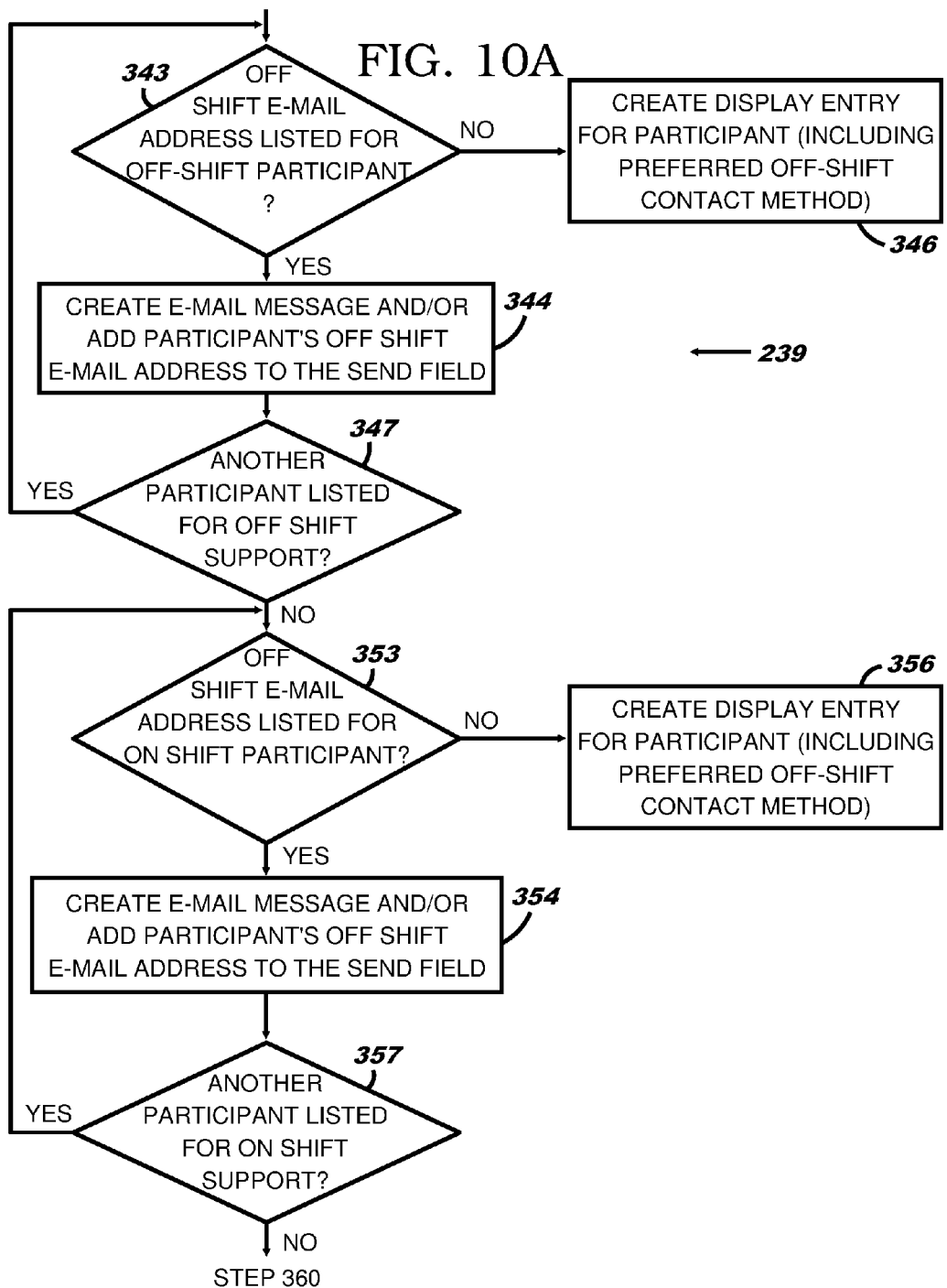

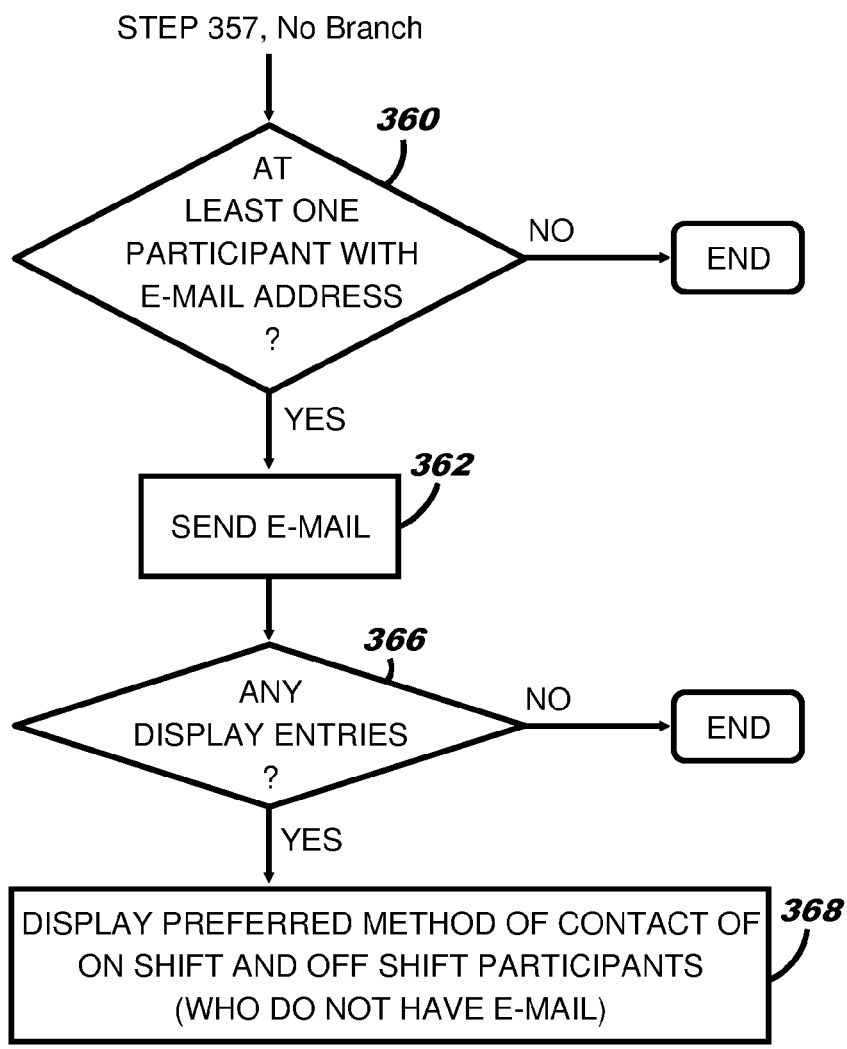

MANAGEMENT OF SUPPORT CENTER CALLS

BACKGROUND OF THE INVENTION

The invention relates generally to computer systems, and deals more particularly with support service for computer systems.

A computer systems or applications operator may detect a problem with a network or hardware or software within a computer system or be notified by a customer of such a problem. For example, if available storage is running low or a server or application goes down, the operator may detect this problem by monitoring status screens or receiving an alert. Typically, there are a pool of technical support people to assist the operator, although some may have expertise for certain types of problems and not for others. The operator will often need to contact one or more support people to solve the problem with the computer system.

In today's global environment, the support people may work at different locations throughout the world, and may work remotely from any support facility. Also, the operator may reside in a much different time zone than the support people and the customer, and detect problems with a computer system at times other than the scheduled shift hours for the customer. Typically, support people are scheduled during various shifts and may carry pagers and cell phones to handle problems occurring during other times. Typically also, there are different preferred methods to contact each support person, depending on whether the support person is working his or her primary scheduled hours or working other times. Such methods of contact include a work telephone, a home telephone, a pager, a cell phone, an e-mail for an e-mail account, an e-mail for a pager, or an e-mail for a cell phone. It has proven cumbersome for the operator to identify the proper support person or people to contact and the preferred method of contact in view of the foregoing complexities.

There is a previously known IBM software tool called "On Call" to assist an operator in identifying a support person to contact. The tool lists for the operator, the primary support person, first backup, second backup and manager, and their status (available or not available). The presentation of the list is fixed, irrespective of the time of day that the problem arises, or differences in time zones. The operator can select one of the support people or their manager, and the tool will display the contact information (i.e. work telephone number, pager number, cell telephone number, e-mail address) for the respective support person. Then, the operator can contact the support person or their manager. While this tool was effective, it did not optimally manage the identification of the proper support person(s) to contact or the preferred method of contact.

Accordingly, an object of the present invention is to better manage the identification of the proper support person(s) to contact and their preferred method of contact.

Another object of the present invention is to facilitate contact with a plurality of support people.

SUMMARY

The invention resides in a computer system and program product for managing support of an application having On Shift support hours and Off Shift support hours. First program instructions receive a request to view contact information for support people for the application, and in response, determine whether the request occurs during the On Shift support hours or the Off Shift support hours. If the request occurs during said On Shift support hours, second program instructions determine the support people who are On Shift and the support people who are Off Shift for the application, and direct display of the On Shift support people and the Off Shift support people in a list such that the support people who are On Shift are listed before the support people who are Off Shift. If the request occurs during the Off Shift support hours, the second program instructions determine the support people who are Off Shift and the support people who are On Shift for the application, and direct display of the Off Shift support people and the On Shift support people in a list such that the support people who are Off Shift are listed before the support people who are On Shift.

The invention also resides in a computer system and program product for managing support of an application. First program instructions receive a request to view contact information for support people for the application, and in response, determine whether the request occurs during On Shift support hours or Off Shift support hours of the application and determine the support people who are On Shift and the support people who are Off Shift for the application. There is a preferred e-mail address for On Shift contact and a preferred e-mail address for Off Shift contact for each of the support people. The preferred e-mail address for On Shift contact is different than the preferred e-mail address for Off Shift contact for at least one of the support people. Second program instructions receive a request to send an e-mail to one or more of the On Shift and Off Shift support people. If the e-mail request occurs On Shift, the e-mail is sent to the preferred On Shift e-mail address for each of the one or more On Shift support people and each of the one or more Off Shift support people. If the e-mail request occurs Off Shift, the e-mail is sent to the preferred Off Shift e-mail address for each of the one or more On Shift support people and each of the one or more Off Shift support people.

DETAILED DESCRIPTION OF THE PREFERRED EMBODIMENTS

Figure 1:
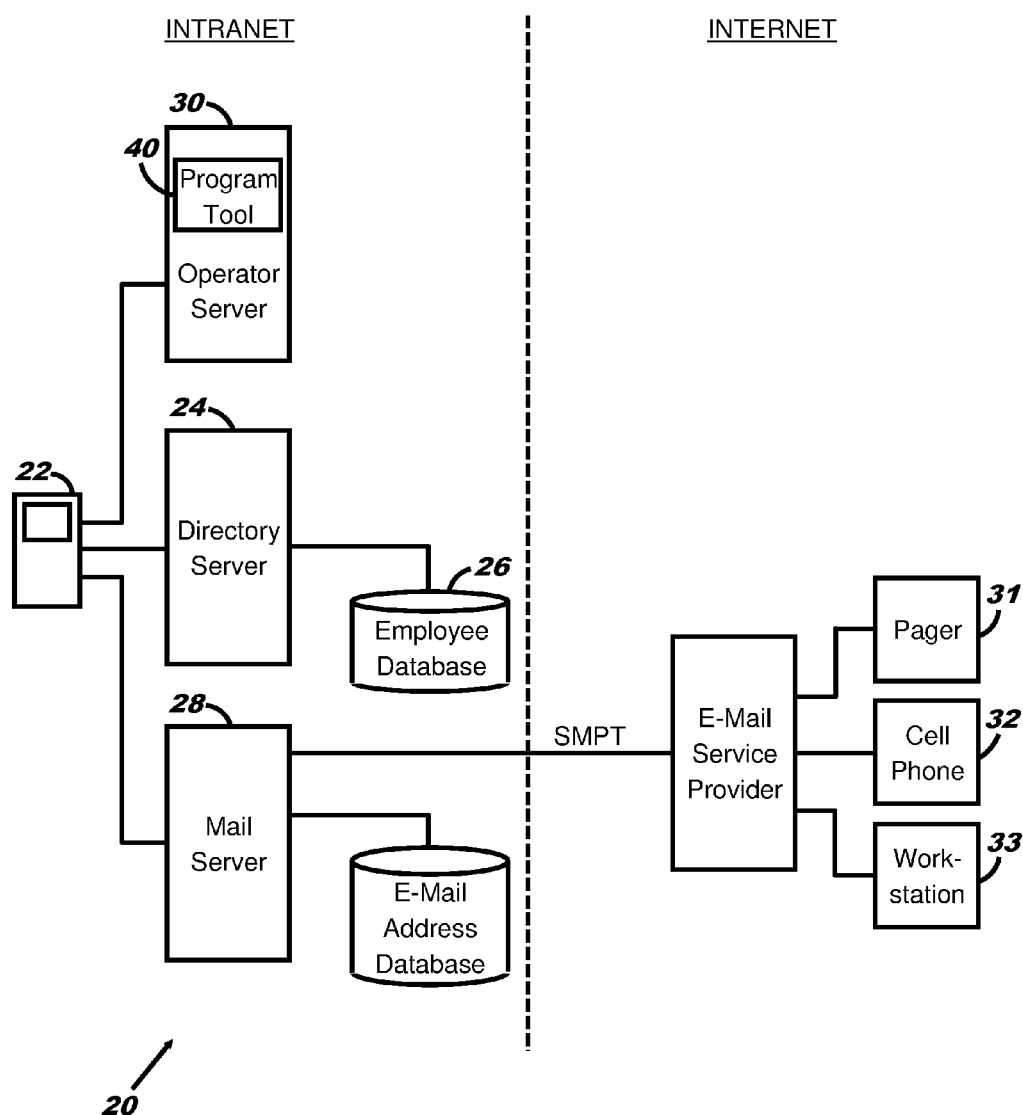
FIG. 1 is a block diagram of a computer system which includes a contact management tool according to the present invention.

Referring now to the drawings in detail, wherein like reference numbers indicate like elements throughout, FIG. 1 illustrates a computer system generally designated 20 which includes the present invention. System 20 comprises a workstation 22 for a systems or applications operator, a server 24 which manages directory information stored in data base 26 for a pool of computer hardware and/or software support people, an e-mail server 28 such as IBM Domino server and a server 30 which can run a support person contact management tool 40 and present the operator interface to the tool 40 on workstation 22. Alternately, tool 40 can run on workstation 22. The e-mail server 28 can send an e-mail to a pager 31, a cell phone 32 or a workstation 33 (using Simple Mail Transfer Protocol in the case of the pager, cell phone, and e-mail account). In the case of the pager 31 or cell phone 32, the e-mail is typically sent via a pager or cell phone service provider 35. As explained in more detail below, contact management tool 40 is used by the operator to optimally identify, determine how to contact and contact one or more of the support people. Contact management tool 40 has two phases of operation—setup by the operator or support people and subsequent use by the operator.

Figure 2:
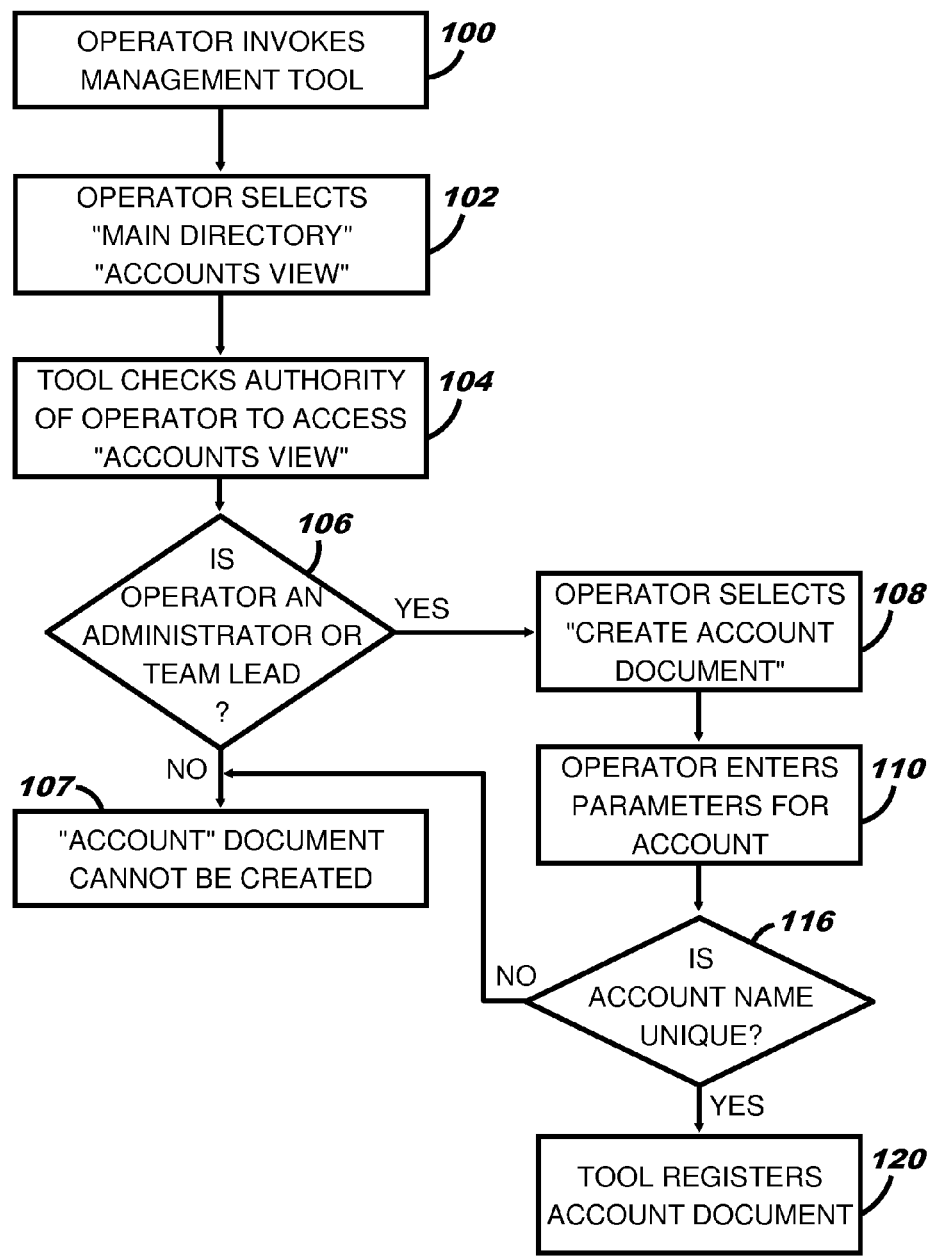
FIG. 2 is a flow chart illustrating a process for defining an account with the contact management tool of FIG. 1.
Figure 3:
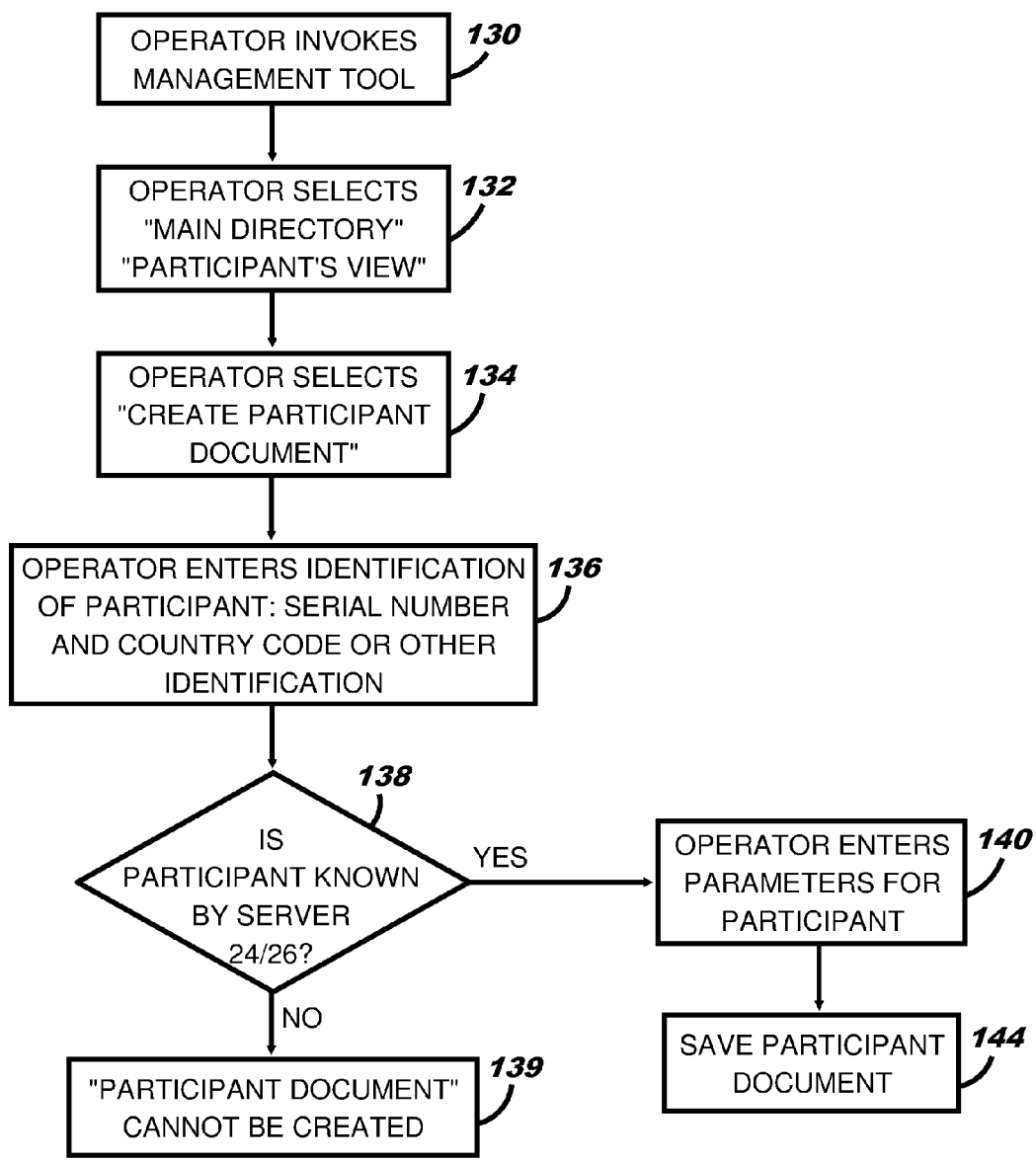
FIG. 3 is a flow chart illustrating a process for defining a participant with the contact management tool of FIG. 1.
Figure 4:
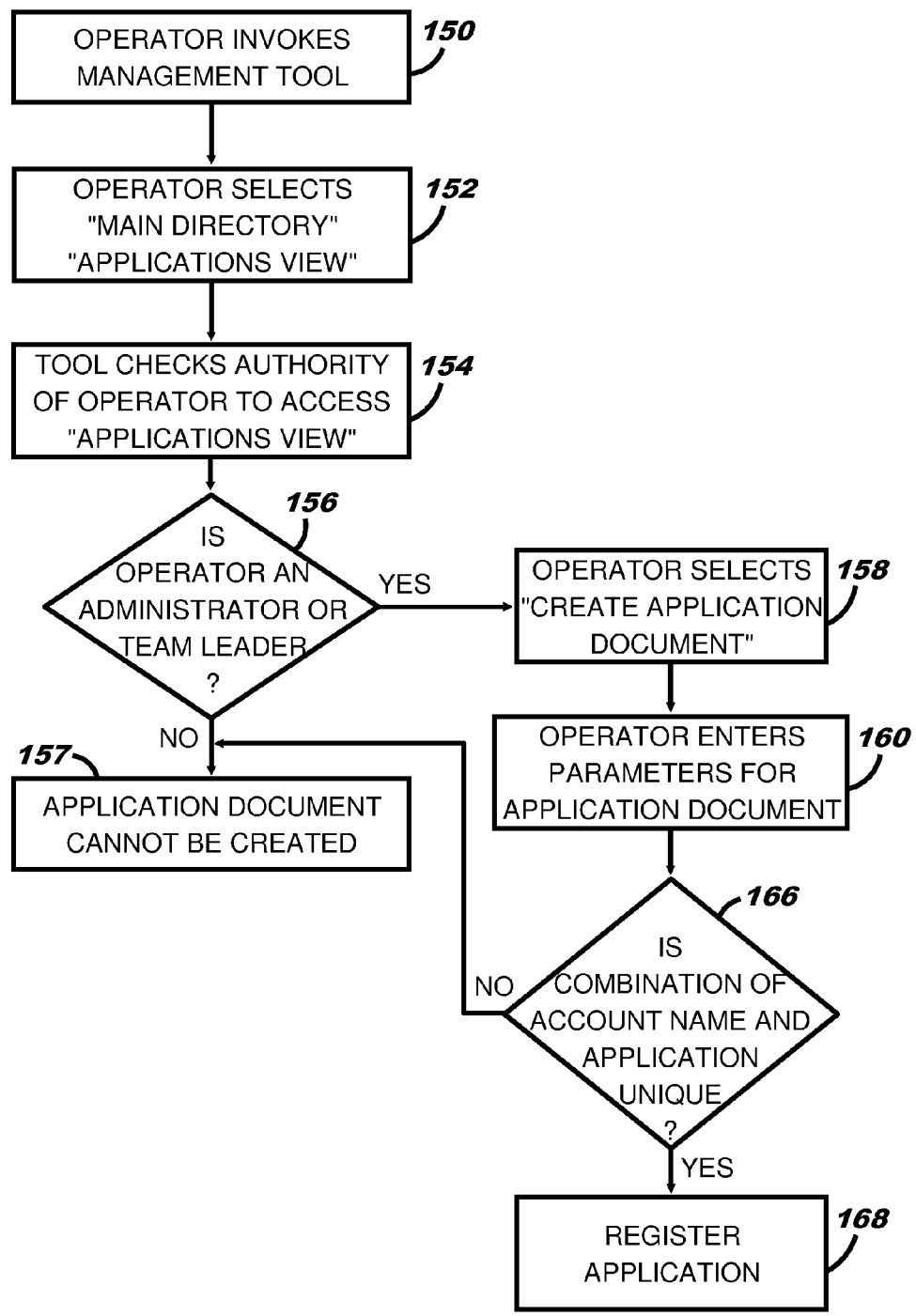
FIG. 4 is a flow chart illustrating a process for defining an application contact document with the contact management tool of FIG. 1.
Figure 5:
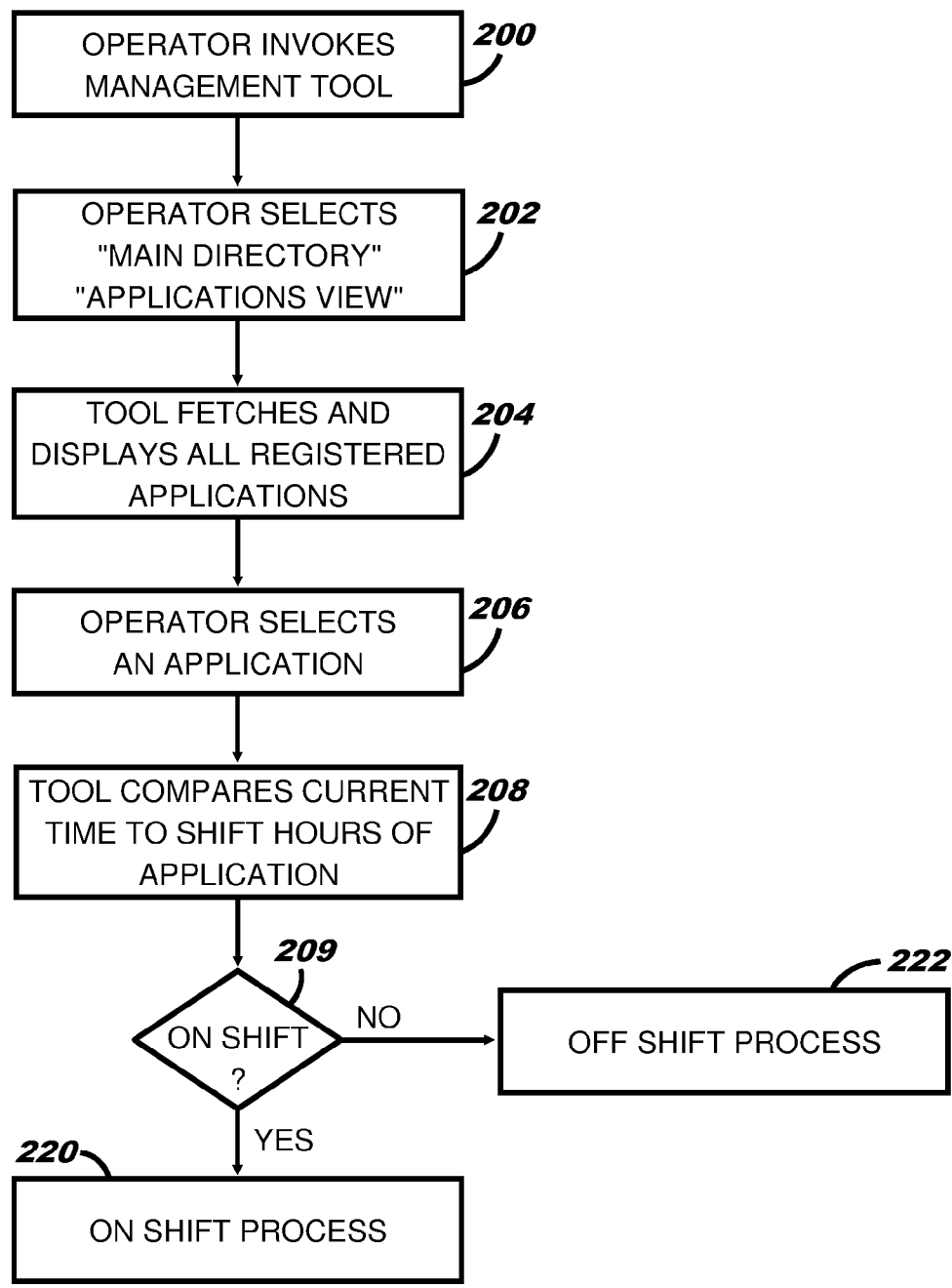
FIGS. 5, 6, 7, 8, 9(A and B), 10 (A and B) and 11 form a flow chart illustrating use of the contact management tool of FIG. 1, including use of the defined account, participant and application contact of FIGS. 2, 3 and 4.
Figure 6:
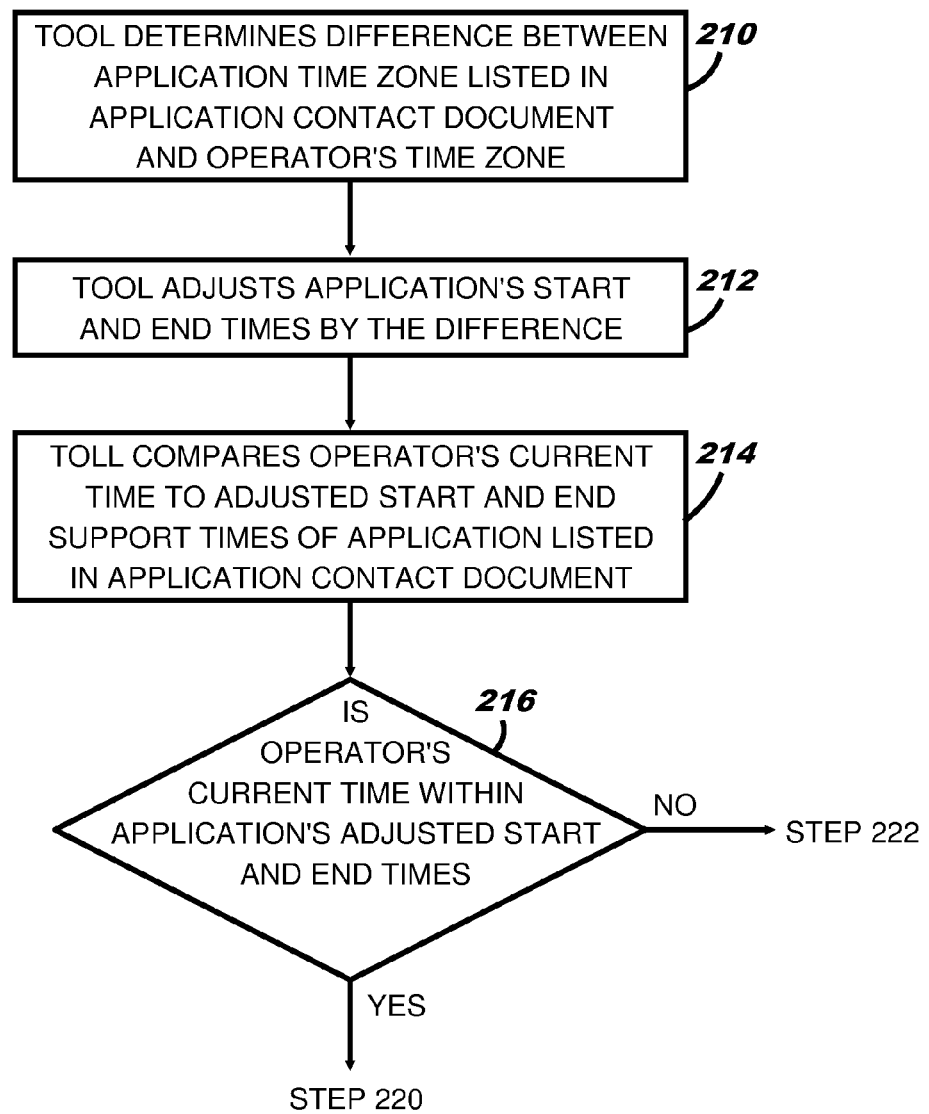

FIGS. 2-4 illustrate the setup phase of tool 40. To begin the setup phase, an operator (or support person) defines a new customer account as illustrated in FIG. 2 as follows. Each "account" can be associated with one or more software applications. The operator logs on and invokes tool 40 (step 100), and then selects "main directory" and "accounts view" icons (step 102). In response, tool 40 checks whether or not the operator has authority to access the account (step 104). In the illustrated embodiment, only certain people designated in an access control list as an administrator or team leader, have authority. If the operator does not have the requisite authority, (decision 106, no branch), then tool 40 cannot create the new account (step 107). However, if the operator has the requisite authority (decision 106, yes branch), the operator can select an icon to create an account document, and the tool creates a file for this account (step 108). Then, the operator enters the following parameters for this account (which can be new or pre-existing) (step 110):

account name,
    time zone shift hours—start and end of On Shift hours,
    account focal point,
    document creator,
    account comments Next, tool 40 checks whether the account name is unique (step 116). If so, tool 40 registers the account name (so that the same account name cannot be used for another account) (step 120). If not, the account cannot be setup with this name (step 107).

Before or after an account is created, each "participant" i.e. support person and their manager for the account, is defined as illustrated in FIG. 3. Each of the support people for an account application has expertise for the account application. (Different support people can be designated to support different applications for the same account.) An operator (or a support person) logs on and invokes tool 40 (step 130). Then, the operator selects the "main directory", "Participant" view icon (step 132). Next, the operator selects a "create participant document" icon, and in response, tool 40 creates a file for this participant (step 134). Next, the operator enters as preliminary data the participant's employee serial number and country code or e-mail address (step 136). Next, tool 40 determines, based on the preliminary data and a query to server 24, if this participant is recorded in the directory 26. If not, then the Participant document cannot be created (step 157). If so, (decision 138, yes branch), then tool 40 solicits the following supplemental information from the operator for each of the participants for the application (step 140):

e-mail address of owner (i.e. owner, usually the creator, of this document), division of owner,
    department of owner,
    e-mail address of manager of owner,
    whether the owner is a manager,
    first and last name of the participant,
    whether the participant is a team leader,
    names of applications (or optionally hardware components) that this participant supports,
    On Shift contact information:
    Participant's preferred method of contact (office phone via tie line or external number, home phone, cellular phone, pager or e-mail)
    Office tie line phone number
    Office external phone number
    Home phone number
    Cellular phone number
    Pager type
    Pager phone number
    Pager PIN
    E-mail address
    Off Shift contact information:
    Participant's preferred method of notification (office phone via tie line or external number, home phone, cellular phone, pager or e-mail)
    Office tie line phone number
    Office external phone number
    Home phone number
    Cellular phone number
    Pager type
    Pager phone number
    Pager PIN
    E-mail address Assuming the operator enters the required parameters above, then tool 40 saves the foregoing data into the "Participant" document (step 144). The foregoing steps of FIG. 3 are repeated for each support person and manager that supports the account application.

After the definition of the account, an operator defines contact information for support people for each application used by the account, as illustrated in FIG. 4. (The steps of FIG. 4 are repeated for each account application.) As explained in more detail below, when an operator experiences a problem with the application, the operator can contact one or more of the support people of their manager listed in the "Application Contact" document defined in FIG. 4. The operator (or support person or manager of the support people) invokes tool 40 (step 150) and then selects an "applications" icon (step 152). In response, tool 40 checks whether the operator has the requisite authority to access or create an Applications Contact document (step 154). This check is made by reading from the access control list whether or not the operator has administrative or team leader authority. If not, (decision 156, no branch), then tool 40 cannot define the Application Contact document (step 157). If so (decision 156, yes branch), then the operator can select to create a new Application Contact document, and the tool creates a file for this document (step 158). Then, the operator enters the following parameters for the application contacts (step 160):

Account name
    Application name
    Document creator
    Time zone shift hours
    Start and end of On Shift hours
    Application comments
    On Shift Personnel:
    On Shift primary contact
    Preferred On Shift contact method
    Contact comments
    On Shift first backup
    Preferred On shift contact method
    Contact comments
    On Shift second backup Preferred On shift contact method
Contact comments
On Shift third backup
Preferred On shift contact method
Contact comments
On Shift application manager
Preferred On shift contact method
Contact comments
Off Shift Personnel:
Off Shift primary contact
Preferred Off Shift contact method
Contact comments
Off Shift first backup
Preferred Off shift contact method
Contact comments
Off Shift second backup
Preferred Off shift contact method
Contact comments
Off Shift third backup
Preferred Off shift contact method
Contact comments
Off Shift application manager
Preferred Off shift contact method
Contact comments Assuming the operator enters the required parameters above, then tool 40 checks if the combination of account name and application name is unique (step 166). If both are valid, then tool 40 registers or saves the account application document (step 168).

After the setup processes of FIGS. 2, 3 and 4 have been performed, tool 40 is ready for use by an operator to contact one or more support people and/or their manager. FIGS. 5-11 illustrate a process whereby an operator using tool 40 can identify the best support person or people to contact at any time the problem is detected, the preferred method to contact each of the support people at that time, and if desired, to broadcast an e-mail to all the support people, i.e. participants, for an application in response to a problem with that application. (The operator can detect the problem directly, or be notified of the problem by a customer.) The preferred method of contact can be work or home telephone, cell phone, pager or e-mail. Depending on what e-mail address is listed for each participant, the e-mail can be the address of the participant's employer e-mail account, pager, cell phone or any other communications device that supports e-mail.

To begin the process, the operator invokes the tool 40 (step 200), and then selects from the "main directory", "applications" view (step 202). In response, tool 40 presents the operator with a list of applications and their respective accounts which were registered with the tool pursuant to all successful iterations of step 160 of FIG. 4 (step 204). Next, the operator selects an application document to view (step 206). In response, tool 40 presents to the operator the information entered in step 160, including the start and end of the On Shift hours registered for this application (and the account in which the problem arose) (step 206). Then, tool 40 automatically determines whether the current time is "on shift" or "off shift" for the application (step 208 and decision 209). Step 208 and decision 209) are further described in FIG. 6. Tool 40 determines the difference between the time zone for the subject account application listed in the application contact document and the time zone of the operator (step 210). Then, tool 40 adjusts the On Shift start and end times of the application support by the difference in time zones (step 212). Next, tool 40 determines if the operator's current time is between the adjusted On Shift start and On Shift end support times of the account application listed in the application contact document (step 216). If so, the current time is considered "On Shift" for the account application support, and tool 40 proceeds to "On Shift" processing (step 220). If not, the current time is considered "Off Shift" for the account application support, and tool 40 proceeds to "Off Shift" processing (step 222).

Figure 7:
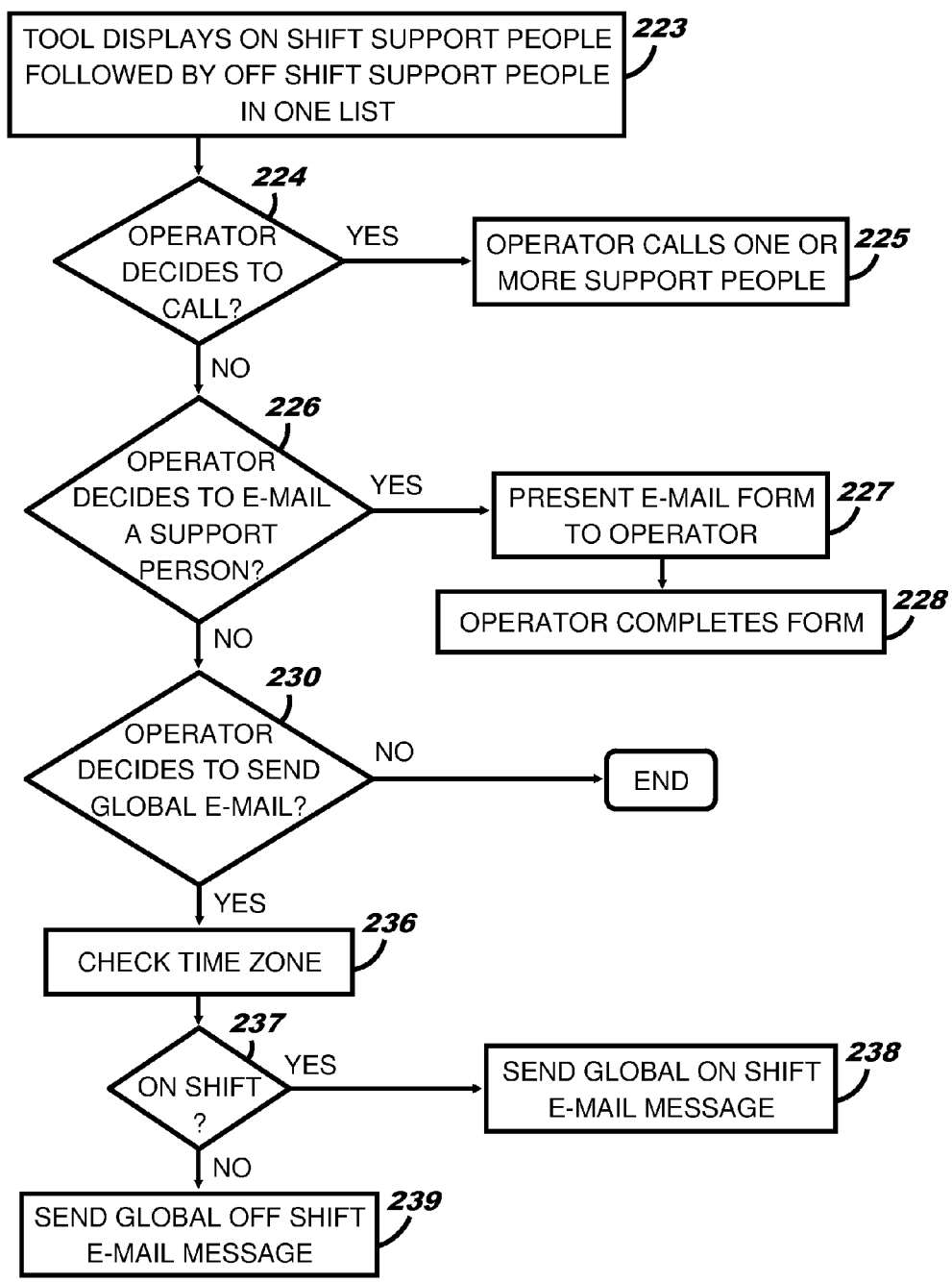

FIG. 7 illustrates the On Shift processing step 220 in more detail. In step 223, tool 40 directs the display of a list of the On Shift participants (i.e. support people and their manager currently on their primary/regular shift), followed by a list of the Off Shift participants (i.e. support people and their manager not currently on their primary/regular shift). The On Shift people are listed in the order of primary contact, first backup, second backup, third backup, and manager. The Off Shift people are listed in the order of primary contact, first backup, second backup, third backup, and manger. Tool 40 identifies the On Shift participants by reading the "On Shift Personnel" parameters in the Application Contact document. Tool 40 identifies the Off Shift participants by reading the "Off Shift Personnel" parameters in the Application Contact document. The display of step 223 also lists the different methods of contact for each On Shift and Off Shift participant: Office tie line phone number, Office external phone number, Home phone number, Cellular phone number, Pager type, Pager phone number, Pager PIN and Hot message e-mail address. The operator can then call any of the participants directly by using the specified telephone or pager number (decision 224 and step 225). The display of step 223 also allows the operator to select an On Shift or Off Shift participant's e-mail address (step 226). In such a case, tool 40 will prepare the addressing of the e-mail and present a field for the operator to enter the content of the e-mail and then forward the e-mail to mail server 28 (step 227). The display of step 223 also includes a "send global message" icon/option which the operator can select with the mouse. If the operator selects the "send global message" icon (step 230), then tool 40 will check the time zone of the account application to determine if the current time corresponds to the account application's On Shift or Off Shift hours (step 236 and decision 237). If the current time corresponds to the account application's On Shift hours, tool 40 proceeds according to step 238—"On Shift send global e-mail". If not, tool 40 proceeds according to step 239—"Off Shift send global e-mail".

Figure 8:
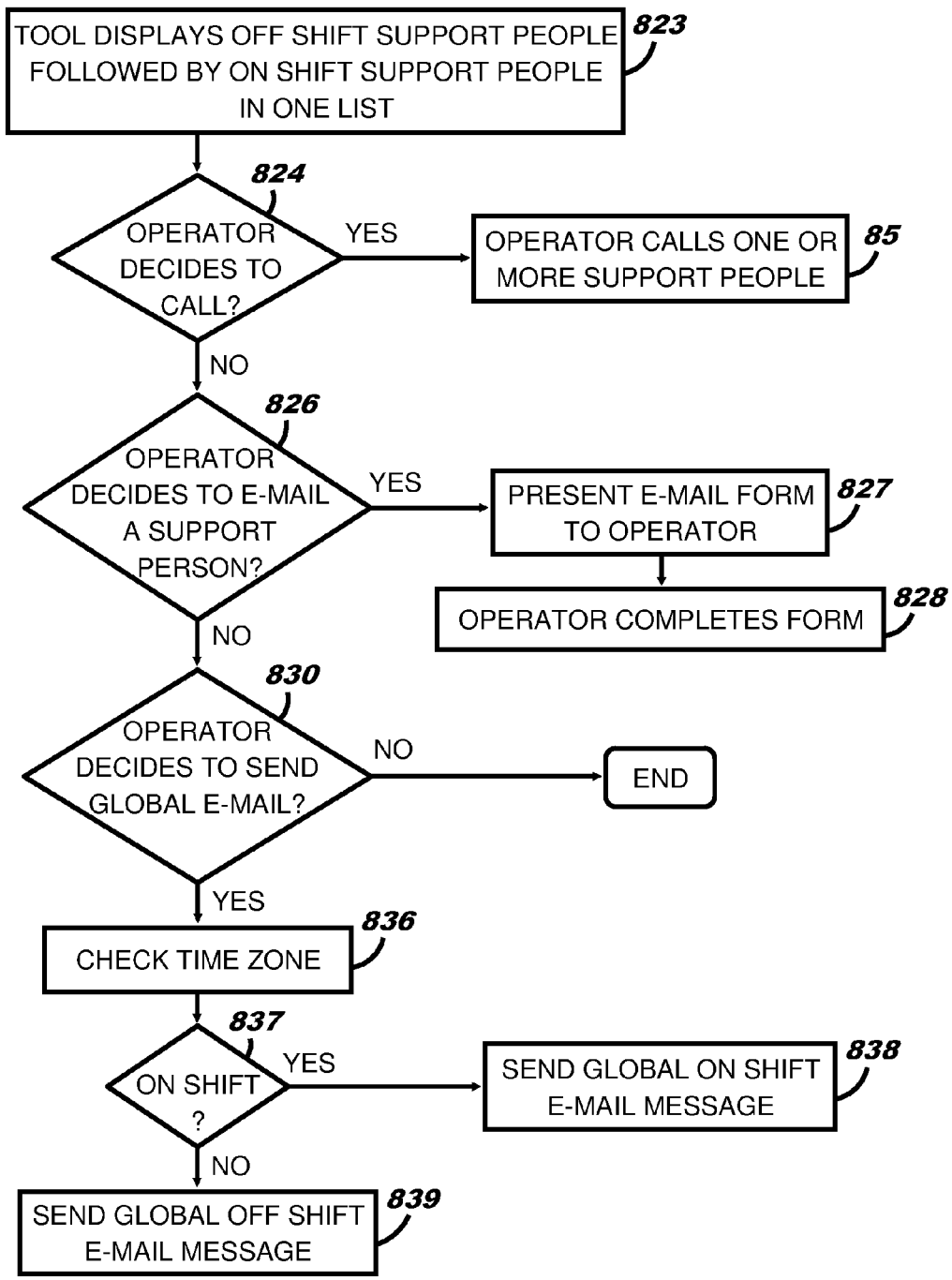

FIG. 8 illustrates the Off Shift processing step 222 in more detail. In step 823, tool 40 directs the display of a list of the Off Shift participants (i.e. support people and their manager), followed by a list of the On Shift participants (i.e. support people and their manager). The Off Shift people are listed in the order of primary contact, first backup, second backup, third backup, and manager. The On Shift people are listed in the order of primary contact, first backup, second backup, third backup, and manager. Tool 40 identifies the Off Shift participants by reading the "Off Shift Personnel" parameters in the Application Contact document. Tool 40 identifies the On Shift participants by reading the "On Shift Personnel" parameters in the Application Contact document. The display of step 823 also lists the different methods of contact for each Off Shift and On Shift participant: Office tie line phone number, Office external phone number, Home phone number, Cellular phone number, Pager type, Pager phone number, Pager PIN and Hot message e-mail address. The operator can then call an Off Shift or On Shift participant directly using the specified telephone or pager number (decision 824 and step 825). The display of step 823 also allows the operator to select the e-mail address (step 826). In such a case tool 40 will prepare the addressing of the e-mail and present a field for the operator to enter the content of the e-mail (steps 827 and 828). Then, tool 40 will automatically forward the e-mail to mail server 28 (step 828). The display of step 823 also includes a "send global message" icon which the operator can select with the mouse. If the operator selects the "send global message" icon (step 830), then tool 40 will check the time zone of the account application to determine if the current time corresponds to the account application's On Shift or Off Shift hours (step 836 and decision 837). If the current time corresponds to the account application's On Shift hours, tool 40 proceeds according to step 238—"On Shift send global e-mail". If not, tool 40 proceeds according to step 239—"Off Shift send global e-mail".

Figure 9B:
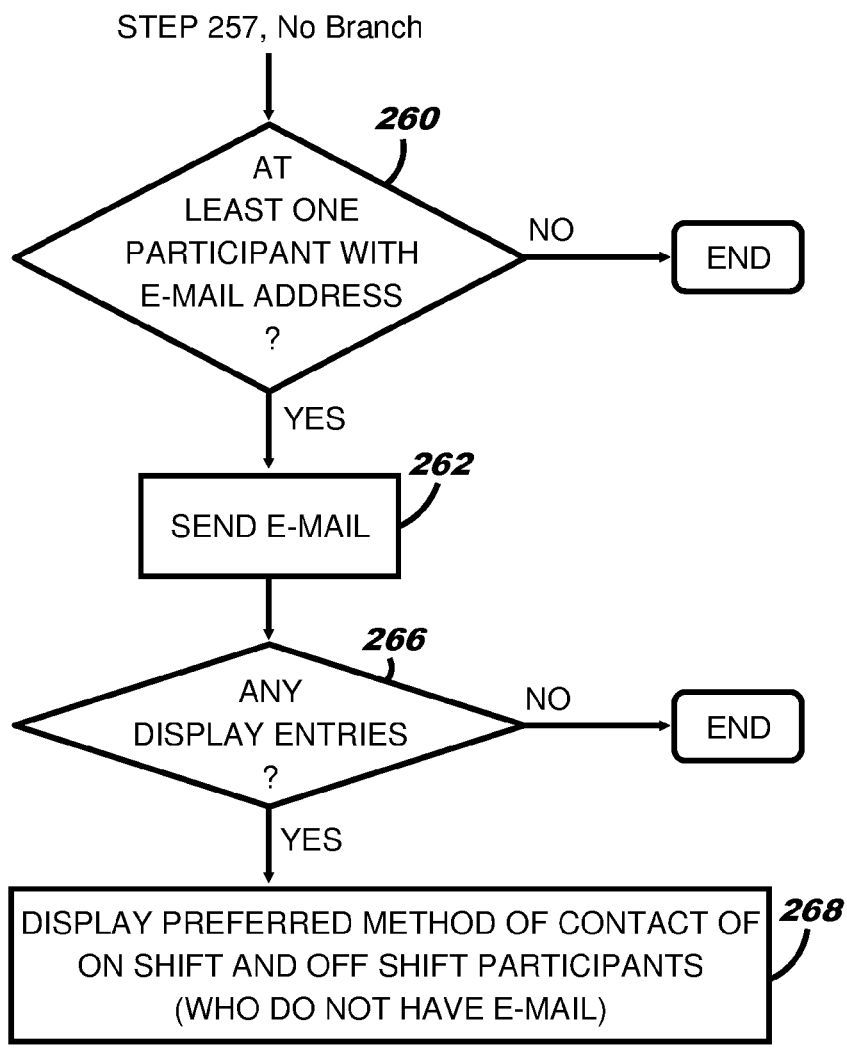

FIGS. 9(A and B) illustrates step 238 in more detail—"On Shift send global e-mail". The following steps 243-247 of FIG. 9(A and B) are performed iteratively for each On Shift Participant (i.e. primary, first backup, second backup and third backup and their manager). Tool 40 determines if there is an On Shift e-mail address listed in the Application Contact document for one of the On Shift participants (decision 243). If not, then tool 40 creates a display entry for the preferred On Shift method of contact of the On Shift participant, for example, a telephone number or pager number (step 246). However, if the On Shift participant has an On Shift e-mail address listed in the Application Contact document, (decision 243, yes branch) tool 40 sets up an e-mail message by creating a form for the e-mail, if not already created, and adding the participant's On Shift e-mail address to the address list of this e-mail (step 244). If there is another On Shift participant (decision 247, yes branch), then tool 40 loops back to decision 243 to repeat the foregoing steps. After steps 243-247 are performed for each On Shift participant, the following steps 253-257 of FIG. 9(A and B) are performed for each Off Shift participant (i.e. primary, first backup, second backup, third backup, and manager). Tool 40 determines if there is an On Shift e-mail address listed in the application contact document for the Off Shift participant (decision 253). If not, then tool 40 creates a display entry for the preferred On Shift method of contact of the Off Shift participant, for example, a telephone number or pager number (step 256). However, if the Off Shift participant has an On Shift e-mail address listed in the Application Contact document, (decision 253, yes branch) tool 40 sets up an e-mail message by creating a form for the e-mail, if not already created, and adding the Off Shift participant's On Shift e-mail address to the address list of this e-mail (step 254). If there is another Off Shift participant (decision 257, yes branch), then tool 40 loops back to decision 253.

Next, assuming there is at least one "On Shift" or Off Shift" participant with an e-mail address listed in the application contact document (decision 260), tool 40 sends the e-mail with the foregoing message (step 262). If there was no participant with an e-mail address or after the e-mail of step 262 is sent, tool 40 determines if any display entries were created in steps 246 or 256 (decision 266). If so, then tool 40 displays these entries, i.e. the names of the On Shift and Off Shift participants without an e-mail address and their preferred method of contact of each of them (step 268). Then, the operator can utilize that method of contact as described in steps 224-228 of FIG. 7 (for On Shift) and in steps 824-828 of FIG. 8 (for Off Shift).

Referring again to step 236 of FIG. 7 in the case where the operator selected to "send global message", if the account application is currently "Off Shift"??, then tool 40 proceeds to step 239, "Off Shift send global e-mail". FIG. 10(A and B) illustrates step 239 in more detail. The following steps 343-347 of FIG. 10(A and B) are performed for each Off Shift Participant (i.e. primary, first backup, second backup and third backup and their manager). Tool 40 determines if there is an Off Shift e-mail address listed in the Application Contact document for the Off Shift participant (decision 343). If not, then tool 40 creates a display entry for the preferred Off Shift method of contact of the Off Shift participant(s), for example, a telephone number or pager number (step 346). However, if the Off Shift participant has an Off Shift e-mail address listed in the Application Contact document, (decision 343, yes branch) tool 40 sets up an e-mail message by creating a form for the e-mail, if not already created, and adding the Off Shift participant's e-mail address to the address list of this e-mail (step 344). If there is another Off Shift participant (decision 347, yes branch), then tool 40 loops back to decision 343 to repeat steps 343-347 for the next Off Shift participant. After steps 343-347 have been performed for all Off Shift participants, tool 40 performs the following steps 353-357 of FIG. 10(A and B) for each On Shift Participant (i.e. primary, first backup, second backup and third backup and their manager). Tool 40 determines if there is an Off Shift e-mail address listed in the application contact document for the On Shift participant (decision 353). If not, then tool 40 creates a display entry for the preferred Off Shift method of contact of the On Shift participant(s), for example, a telephone number or pager number (step 356). However, if the On Shift participant has an Off Shift e-mail address listed in the application contact document, (decision 353, yes branch) tool 40 sets up an e-mail message by creating a form for the e-mail, if not already created, and adding the On Shift participant's e-mail address to the address list of this e-mail (step 354). If there is another On Shift participant (decision 357, yes branch), then tool 40 loops back to decision 353.

Next, assuming there is at least one "Off Shift" or On Shift" participant with an e-mail address listed in the Application Contact document (decision 360), tool 40 sends the e-mail with the foregoing message (step 362). If there was no participant with an e-mail address or after the e-mail of step 362 is sent, tool 40 determines if any display entries were created in steps 346 or 356 (decision 366). If so, then tool 40 displays these entries, i.e. the names of the Off Shift and On Shift participants without an e-mail address and their preferred method of contact (step 368). Then, the operator can utilize that method of contact as described in steps 224-228 of FIG. 7 (for On Shift) and in steps 824-828 of FIG. 8 (for Off Shift).

Figure 11:
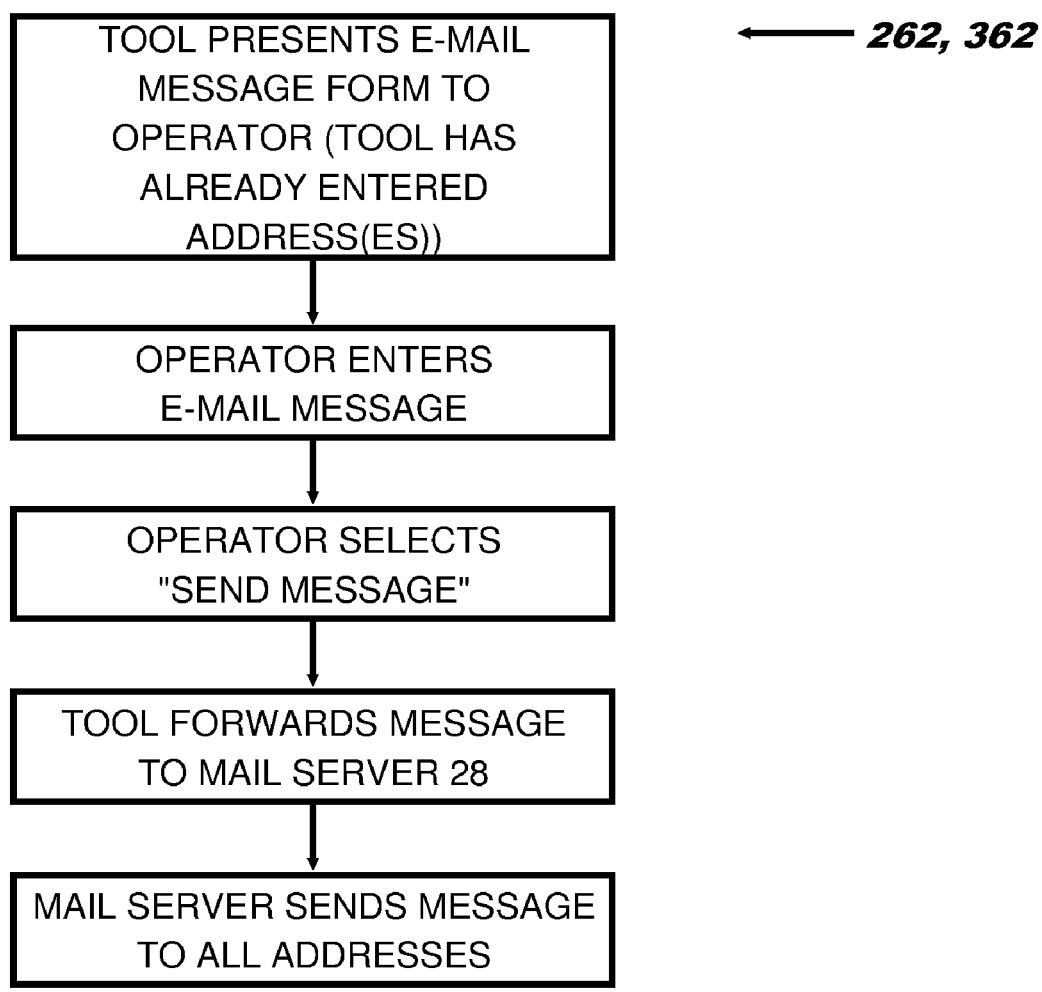

FIG. 11 illustrates the "send message" step 262 of FIG. 9(A and B) and step 362 of FIG. 10(A and B) in more detail. Tool 40 directs the display of an e-mail message form (step 600), and then the operator types in the e-mail message (step 602). Typically, the message will describe the nature of the problem, and may schedule a conference call of some or all the participants to determine how to correct the problem. Then, the operator selects a "send" icon, or tool 60 asks the operator if the operator is ready to send the e-mail message (decision 604). When the operator selects to send the message, tool 40 logs the message (step 606), and also forwards the message to an e-mail message service such as IBM Lotus Notes service. The message service will then send the message to all e-mail addresses in the address list (step 608). Depending on the e-mail address, the e-mail can go to an e-mail account, pager, cell phone or any device which supports e-mails.

Based on the foregoing, a support person contact management tool according to the present invention has been disclosed. However, numerous modifications and substitutions can be made without deviating from the scope of the present invention. For example, the contact management tool is useful to manage problems with computer networks, hardware as well as software. Therefore, the present invention has been disclosed by way of illustration and not limitation, and reference should be made to the following claims to determine the scope of the present invention.

The invention claimed is:

1. A computer program product for managing contact information of support people for one or more applications each application having On Shift support hours and Off Shift support hours and a plurality of On Shift and Off Shift support people, said program product comprising:

a computer readable storage medium;

program instructions stored on said computer readable storage medium for execution on a computer, comprising:

first program instructions to receive a request to view contact information for a plurality of support people for an application, and in response, determine whether said request occurs during said On Shift support hours or said Off Shift support hours for said application, and second program instructions, responsive to said request occurring during said On Shift support hours for said application, to determine the support people who are On Shift and the support people who are Off Shift for said application, and direct display of contact information of said On Shift support people and said Off Shift support people in a list wherein said support people who are On Shift are listed before said support people who are Off Shift;

said second program instructions, further responsive to said request occurring during said Off Shift support hours for said application, to determine the support people who are Off Shift and the support people who are On Shift for said application, and direct display of contact information of said Off Shift support people and said On Shift support people in a list wherein said support people who are Off Shift are listed before said support people who are On Shift;

third program instructions to create a database specifying said On Shift support hours and said Off Shift support hours for each of said one or more applications, and specifying which of said support people are On Shift and which of said support people are Off Shift for each of said On Shift support hours and Off Shift support hours, wherein the plurality of said On Shift support people includes an On Shift primary support person and an On Shift backup support person, and the plurality of said Off Shift support people includes an Off Shift primary support person and an Off Shift backup support person, and wherein in each of said display of contact information of support people, the respective primary support person is listed before the respective backup support person.

2. The computer program product as set forth in claim 1 wherein there is a preferred On Shift contact method and a preferred Off Shift contact method for each of said On Shift support people and each of said Off Shift support people, and each of said lists specifies said preferred On Shift contact method for each of said On Shift support people and said preferred Off Shift contact method for each of said Off Shift support people.

3. The computer program product as set forth in claim 1, wherein said database comprises a plurality of participant records for each of said support people and a plurality of application records for said application.

4. The computer program product as set forth in claim 3, wherein said plurality of participant records for a given one of said support people comprises (i) an identification of applications that said given one of said support people supports, (ii) On Shift contact information, (iii) On Shift preferred method of contact, (iv) Off Shift contact information, and (v) Off Shift preferred method of contact.

5. The computer program product as set forth in claim 3, wherein said plurality of application records for said application comprises (i) an account name that said application is associated with, (ii) time zone shift hours, (iii) On Shift start and end hours, (iv) On Shift personnel, and (v) Off Shift personnel.

* * * * *

UNITED STATES PATENT AND TRADEMARK OFFICE
CERTIFICATE OF CORRECTION

PATENT NO. : 7,596,504 B2
APPLICATION NO. : 10/644677
DATED : September 29, 2009
INVENTOR(S) : Hughes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1786 days.

Signed and Sealed this

Twenty-eighth Day of September, 2010

David J. Kappos
*Director of the United States Patent and Trademark Office*